(12) United States Patent
Som

(10) Patent No.: US 9,579,800 B2
(45) Date of Patent: Feb. 28, 2017

(54) DEVICE AND METHOD FOR OPERATING AN INDUSTRIAL ROBOT

(71) Applicant: REIS GROUP HOLDING GMBH & CO. KG, Obernburg (DE)

(72) Inventor: Franz Som, Lutzelbach (DE)

(73) Assignee: REIS GROUP HOLDING GMBH & CO. KG, Obernburg (DE)

( * ) Notice: Subject to any disclaimer, the term of this patent is extended or adjusted under 35 U.S.C. 154(b) by 0 days.

(21) Appl. No.: 14/388,105

(22) PCT Filed: Mar. 28, 2013

(86) PCT No.: PCT/EP2013/056783
§ 371 (c)(1),
(2) Date: Sep. 25, 2014

(87) PCT Pub. No.: WO2013/144323
PCT Pub. Date: Oct. 3, 2013

(65) Prior Publication Data
US 2015/0045951 A1    Feb. 12, 2015

(30) Foreign Application Priority Data
Mar. 29, 2012    (DE) ........................ 10 2012 102 749

(51) Int. Cl.
*G05B 19/04*    (2006.01)
*G05B 19/18*    (2006.01)
(Continued)

(52) U.S. Cl.
CPC ............ *B25J 13/06* (2013.01); *G05B 19/409* (2013.01); *G06F 3/03* (2013.01); *G06F 3/0412* (2013.01);
(Continued)

(58) Field of Classification Search
USPC ................................................. 700/245–264
See application file for complete search history.

(56) References Cited

U.S. PATENT DOCUMENTS 4,888,708 A * 12/1989 Brantmark ........... G05B 19/427
                                                                 700/264
5,937,143 A *  8/1999 Watanabe .............. B25J 9/1671
                                                                 700/264

(Continued)

FOREIGN PATENT DOCUMENTS

AT            504566 B1    10/2008
CN         201537925 U     8/2010
(Continued)

OTHER PUBLICATIONS

Chinese Search Report dated Jul. 29, 2015, corresponding to Chinese Patent Application No. 201380017705.8.
(Continued)

*Primary Examiner* — Bhavesh V Amin
(74) *Attorney, Agent, or Firm* — Ladas & Parry LLP

(57) ABSTRACT

The invention relates to a hand-held operating device for operating an industrial robot, the device including a graphical operator interface having a touch-sensitive display for displaying at least one virtual operating element, which represents a function for operating the robot, and which can be operated by touching the operating element with a finger of an operating person or a pen, a control unit for controlling the graphical operator interface and for communicating with a robot controller, a haptic mark associated with at least one virtual operating element and designed as a guide, which haptic mark is arranged in a display frame; that surrounds the touch-sensitive display at least in some areas and/or is arranged in frame segments of the display frame and by means of which haptic mark the finger of an operating (Continued)

person or the pin can be guided in the direction of the at least one operating element.

12 Claims, 4 Drawing Sheets

(51) Int. Cl.
    *B25J 13/06*     (2006.01)
    *G05B 19/409*     (2006.01)
    *G06F 3/041*     (2006.01)
    *G06F 3/0488*     (2013.01)
    *G06F 3/03*     (2006.01)

(52) U.S. Cl.
    CPC ............. *G06F 3/04886* (2013.01); *G05B 2219/23377* (2013.01); *G05B 2219/23378* (2013.01); *G05B 2219/36168* (2013.01); *G05B 2219/39443* (2013.01)

(56) References Cited

U.S. PATENT DOCUMENTS

| | | | | |
|---|---|---|---|---|
| 6,134,102 A * | 10/2000 | Worn | ............... | B25J 9/1656 361/679.09 |
| 6,167,328 A * | 12/2000 | Takaoka | ............... | B25J 9/1671 318/568.1 |
| 6,292,712 B1 * | 9/2001 | Bullen | ............... | G05B 19/409 700/17 |
| 6,684,264 B1 | 1/2004 | Choi | | |
| 7,164,971 B2 * | 1/2007 | Ferla | ............... | B25J 13/06 700/247 |
| 7,177,724 B2 * | 2/2007 | Cantello | ............... | H01H 9/0214 700/247 |
| 7,403,837 B2 * | 7/2008 | Graiger | ............... | G05B 19/409 361/71 |
| 2002/0045970 A1 * | 4/2002 | Krause | ............... | B25J 9/1656 700/264 |
| 2002/0120361 A1 * | 8/2002 | Kuroki | ............... | G05B 19/00 700/245 |
| 2002/0147528 A1 * | 10/2002 | Watanabe | ............... | B25J 9/1671 700/245 |
| 2004/0068335 A1 * | 4/2004 | Ferla | ............... | B25J 13/06 700/86 |
| 2004/0090428 A1 * | 5/2004 | Crandall, Jr. | ............... | G06F 3/04886 345/173 |
| 2005/0267826 A1 * | 12/2005 | Levy | ............... | B25J 9/1689 705/34 |
| 2007/0021738 A1 * | 1/2007 | Hasser | ............... | A61B 8/4218 606/1 |
| 2008/0255704 A1 * | 10/2008 | Braut | ............... | B25J 13/02 700/264 |
| 2009/0289591 A1 * | 11/2009 | Kassow | ............... | B25J 9/1671 318/568.13 |
| 2010/0127975 A1 * | 5/2010 | Jensen | ............... | G06F 3/03547 345/157 |
| 2015/0066209 A1 | 3/2015 | Som | | |

FOREIGN PATENT DOCUMENTS

| | | |
|---|---|---|
| DE | 19901481 A1 | 4/2000 |
| DE | 102010025781 A1 | 1/2012 |
| DE | 102010039540 A1 | 2/2012 |

OTHER PUBLICATIONS

International Search Report dated Sep. 11, 2013, corresponding to International Patent Application PCT/EP2013/056783.
German Office Action dated Nov. 22, 2012, corresponding to German Patent Application 102012102749.8.
Non-English Action with an English translation of the Search Report dated Mar. 30, 2016, for Chinese Application No. 201380017705.8.

* cited by examiner

DEVICE AND METHOD FOR OPERATING AN INDUSTRIAL ROBOT

This application is a 371 of PCT/EP2013/056783, filed on Mar. 28, 2013, which claims priority to German Application No. 102012102749.8, filed Mar. 29, 2012.

The invention relates to a device in the form of a manual operating device for operating an industrial robot, comprising a graphic operator interface with a touch-sensitive display such as a touch display or touchscreen surrounded by a display frame for displaying at least one virtual operating element that represents a function for operating the industrial robot and that can be operated by touch with a finger of an operator or with a pen, a control unit for controlling the graphic operator interface and for communicating with a robot control, and a mark associated with the at least one virtual operating element, haptically designed as a guide and that is arranged in a display frame surrounding the touch-sensitive display at least in areas and/or is arranged in frame sections of the frame by which mark the finger or the pen of the operator can be guided in the direction of the at least one operating element.

Furthermore, the invention relates to a method for operating an industrial robot by a manual device by touching a virtual operating element on a touch-sensitive display of a graphic operator interface, wherein when the virtual operating element is touched a function associated with the operating element is initiated, wherein the touching of the virtual operating element on the surface of the touch-sensitive display is detected by determining a first coordinate of a touch point.

A device for controlling an industrial robot in the form of a manual operating device is described in DE 10 2010 039 540 A1. The manual operating device can be coupled to a robot control in order to program or control the industrial robot.

The manual operating device comprises an electronic system with a microprocessor in order to be able to communicate with the robot control. Furthermore, the manual operating device comprises a display designed as a touchscreen, an emergency stop key and a switch constructed as a lock. In order to manually move, e.g., a robotic arm the manual operating device comprises input means or moving means that can be manually activated independently of each other and are constructed, e.g., as a 6D mouse or as touch control keys. There is the possibility of associating each of the moving means with its own reference coordinate system by the touchscreen.

However, in the known design the control of the industrial robot takes place exclusively via the manually actuatable input means so that the manual operating device is expensive to produce and temperamental in operation.

Another device for operating an industrial robot is described in DE 10 2010 025 781 A1. The manual device in the form of a mobile telephone comprises a touchscreen that on the one hand serves as output means for outputting information from the robot control, in particular for representing an operating surface and at the same time serves as command input means for inputting control commands via keys.

The manual device is detachably fastened to a portable safety device by a clamping device such as is known in principle, for example, for holding mobile telephones in motor vehicles and is connected to it by a USB interface. The safety input device comprises an emergency stop button, an enabling switch and a selector switch for the operating type. A disadvantage of this embodiment is that an operator is always forced in order to safely operate the virtual keys to look at the touchscreen in order to avoid false inputs. The same applies in the case of poor environmental conditions such as, for example, a strong incidence of light or darkness that would made an operating of the touchscreen more difficult.

US-A-2004/0090428 concerns a monitor with a touchscreen whose frame has haptic marks in order to facilitate the guiding of a finger on the touchscreen. The touchscreen itself has, in distinction to standard touchscreens, raised areas that perform the function of virtual operating elements.

A touchscreen according to US-A-2010/012795 has vertically and/or horizontally running structures on the display in order to facilitate the guiding of a finger.

The present invention is based on the task, among other things, of further developing a method and a device of the initially cited type in such a manner that the safety is increased during the operating of an industrial robot. The transparency of the touch-sensitive display should, in addition, not be influenced by overlays.

The task is solved by a device of the initially cited type substantially in that a plurality of virtual operating elements are arranged along the display frame and adjacent to it, and that each virtual operating element is associated with a haptic mark in or on the display frame.

It is provided that the at least one haptic mark is arranged in a display frame surrounding the touch-sensitive display at least in areas, and that the at least one virtual operating element is placed on the touch-sensitive display adjacent to the display frame. Frame sections such as inside edges can also serve as haptic marks. Based on the teaching of the invention, the frame with the haptic marks and the touch-sensitive display form a functional unit since the finger guidance and the initiation of functions merge into one another without losing the finger contact to the frame and the display. An erroneous operation is minimized since the sensing of the position and the initiation of the virtual operating element merge without interruption into one another. This makes possible a blind operation. At the same time, it is not required that the construction of the touch-sensitive display is changed but rather a standard touch display can be used as a touch-sensitive display, whereby in particular a capacitive touch display should be used. However, there would also be the possibility of using a resistive touch display. The concept touch display is used in the following.

In another preferred embodiment the haptic marks are arranged symmetrically to a longitudinal and/or transverse axis of the touch display on opposite edges of the display frame.

According to the invention the most important virtual operating elements are placed in the touch display in such a manner that they can be operated blindly, during which the reduced and in particular the distinctive display frame serves for the tactile orientation of the touch display.

On the whole, preferably four different haptic mark types can be distinguished that are preferably arranged symmetrically on the left and/or the right display frame.

The haptic marks of the display frame can be formed as recesses such as a finger trough, as an elevation such as projecting nubs and/or as a frame edge or frame corner. In particular, the haptic marks are formed in such a manner that they can be reliably felt with the fingers. As a result, on the one hand the basically lacking haptic of a touch display is compensated and on the other hand the operator can direct his visual attention onto the robot and the process without having to look at the operating device, which increases the operating safety.

When the haptic mark is designed as a frame edge the finger or the pen make a shifting movement via which a virtual operating element placed on the edge of the display frame and constructed as a shifting element can be moved.

As a result of the construction of the haptic marks as a recess such as a finger trough a high-resolution, haptic orientation on the display frame can be achieved, e.g., for the sensing of positions of virtual operating elements when they are arranged directly adjacent to one of the finger troughs. A virtual operating element can be unambiguously associated with each recess such as a finger trough.

In the embodiment of the haptic mark as a frame corner of the display frame an exact position on the touch display can be defined. Therefore, each of the four corners of the display frame can form a haptic mark. Important virtual operating elements that are to be operated blind can be placed on the selected positions.

In the embodiment of the haptic marks as nubs projecting from the display frame, they can serve as a rough orientation on the display frame. They can be placed on the upper and the lower end of the display frame and thus mark the upper and the lower display limitation. Another nub can be placed in the middle between the upper and the lower limitation with which the middle of the touch display is marked. Therefore, the upper and the lower display half can be sensed.

According to a characteristic inventive embodiment a proven override function that was earlier performed as a jog wheel is performed by a virtual slide element on the touch display whereby the virtual slide element is placed on the touch display along an edge section of the display frame. As a result, its position can be sensed and adjusted by shifting the finger or the pen along the edge section. The blind shifting can be additionally supported by the haptic marks of the edge section. The override can be adjusted in a shifting between two haptic marks by a set amount, e.g., 20%. This function can also be used in order to adjust other analogous magnitudes such as, e.g., process parameters in a blind operation.

As a result of the consequent, keyless design of the graphic operator interface and the symmetrical construction of the housing with the haptic marks arranged symmetrically to the longitudinal central axis, that is, the middle line of the display, an operator can switch the operating surface by a simple setup function from right-hand operation to left-hand operation. All positions of the virtual operating elements are mirrored on the longitudinal central axis of the touch display. This variability is not available in conventional devices with mechanically constructed keys. The longitudinal central axis runs in a rectangular display parallel to and centrally between the longitudinal frame shanks.

Another characteristic inventive embodiment of the device is distinguished in that a housing that receives the touch display is symmetrically constructed. It comprises the display frame with the haptic marks on the front side to the left and the right of the touch display with the aid of which selected positions of the touch display can be sensed. This makes a blind operation of the touch display possible.

The housing in accordance with the invention is distinguished in that two holding strips arranged symmetrically to the longitudinal central axis are formed on a back side with which the device can be securely held with one or with both hands. An enabling switch is integrated in each holding strip, one of which must be selectively activated in order to free the movement of the industrial robot. This symmetrical arrangement prevents the hands from becoming tired since the enabling switches can be activated alternately with the left or the right hand. If one hand becomes tired, the other hand can assume the enabling without the releasing of the movement for moving the robot being interrupted. The holding strips preferably run adjacent to the outer edge of each longitudinal frame shank and merge into it and have a geometry with the shape of a cylindrical section toward the outside.

Furthermore, the invention refers to a characteristic inventive method for operating an industrial robot with a manual device. It provides that the initiation of a touch function requires a manual action of the operator on the touch display. In order to prevent an unintended initiation of virtual operating elements by an unintended touching, a function is not initiated until after the touching of the touch display a special "small movement" is made, e.g., drawing the finger in a defined direction. This results in a reliable touch.

The intensity of the required movement can be adjusted step-by-step: it extends from a simple finger movement, a generally customary operation of the touch display, to a defined gesture. As a consequence of the special impression of the finger troughs in the display edge the finger can slide in a continuation of the finger troughs onto the touch display, thereby initiating a function. If the operator notices that he initiated an undesired function, he can suppress the initiation of the function by drawing his finger back into the original position.

The device of the invention is distinguished over the prior art in particular in that the number of hardware components was reduced to an absolute minimum. All operating functions are consequently realized in touch software with the exception of the safety-relevant switches like "emergency stop" and enable". No other electrical components like membrane keys, switches or signal lights are necessary. Therefore, the system is low-maintenance. A commercially available standard touch display is used, wherein in particular a capacitive touch display is used.

The space savings achieved favors a large, comfortable touch display. The virtual operating elements and displays shown on the touch display are designed for industrial use and are shown in a contrast-rich and large manner so that a reliable operation is possible.

Other details, advantages and features of the invention result not only from the claims, the features to be gathered from them—alone and/or in combination—, but also from the following description of exemplary embodiments to be gathered from the drawings.

Figure 1:
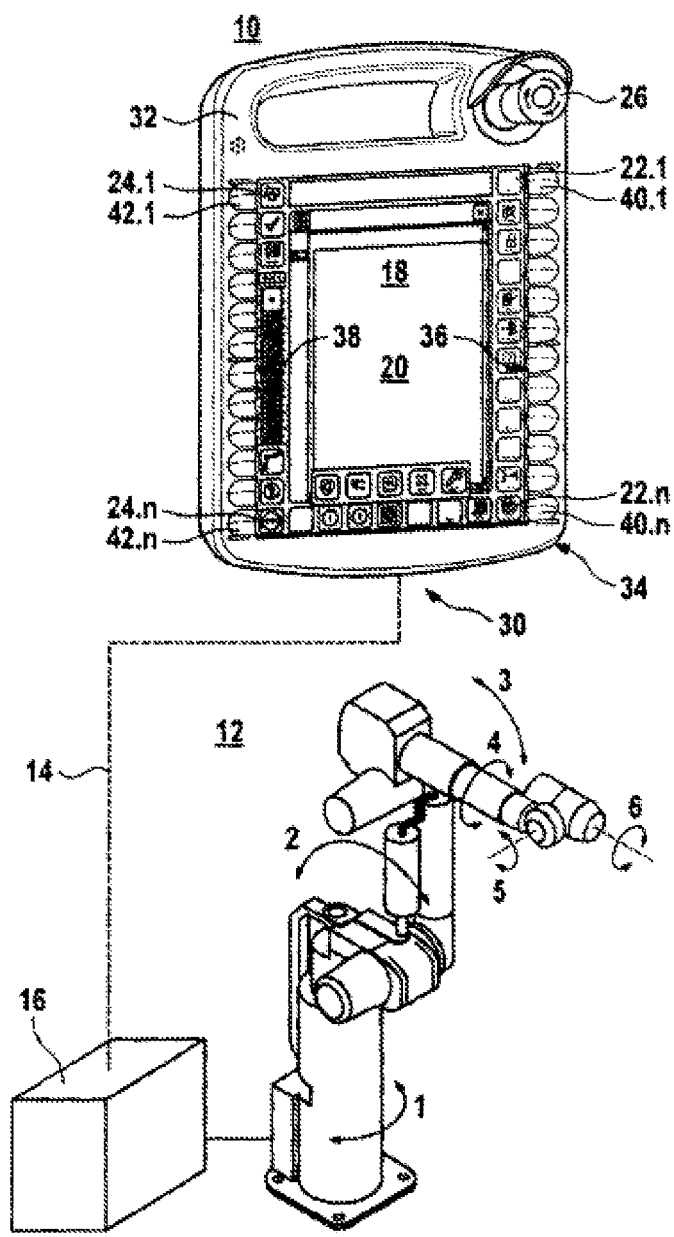
FIG. 1 shows a programmable manual device for operating an industrial robot.

FIG. 1 shows a device 10 in the form of a programmable manual device for operating an industrial robot 12. To this end the manual device 10 is connected by a wireless or wired communication connection 14 to a robot control 16. The manual device 10 comprises a graphical operator interface 18 for the touch-sensitive display 20, called touch display in the following. This concerns in particular a commercially available standard touch display of the capacitive type. However, the invention is not departed from if a resistive touch display is used. A level, that is, smooth sensor surface is utilized by the using of a standard touch display. Overlays on the sensor surface in order to form, e.g., a structure such as an elevation, are not present.

The touch display 20 serves to display at least one virtual operating element 22.1 . . . 22.n, 24.1 . . . 24.n that represents a function for controlling, programming or operating the industrial robot 12, wherein when the virtual operating element 22.1 . . . 22.n, 24.1 . . . 24.n is touched with a finger of an operator or by a pen, the associated function is initiated.

The manual device 10 furthermore comprises a control unit 30 for controlling the graphical operator interface 18 and for communicating with the robot control 16.

The graphical operator interface 18 with the touch display 20 is arranged together with the control unit 30 in a housing 32. The housing 32 forms a display frame 34 that surrounds the touch display 20 on the edges. In addition, a safety-relevant "emergency stop" switch 26 is arranged on an upper side of the housing 32.

The virtual operating elements 22.1 . . . 22.n and 24.1 . . . 24.n are arranged along a frame section 36, 38 of the display frame and adjacent to the touch display 20. In order to make possible a blind operation of the virtual operating elements 22.1 . . . 22.n and 24.1 . . . 24.n, according to a first characteristic concept of the invention haptic marks 40.1 . . . 40.n and 42.1 . . . 42.n are arranged in the frame sections 36, 38. Each haptic mark 40.1 . . . 40.n, 42.1 . . . 42.n can be associated with a virtual operating element 22.1 . . . 22.n, 24.1 . . . 24.n.

In particular, the virtual operating element 22.1 . . . 22.n, 24.1 . . . 24.n is directly adjacent to the haptic mark 40.1 . . . 40.n and 42.1 . . . 42.n, so that a direct transition from the haptic mark 40.1 . . . 40.n and 42.1 . . . 42.n to the virtual operating element 22.1 . . . 22.n, 24.1 . . . 24.n takes place. Consequently, a finger guided along a haptic mark 40.1 . . . 40.n and 42.1 . . . 42.n is guided quasi in one stroke to the virtual operating element 22.1 . . . 22.n, 24.1 . . . 24.n. This avoids or minimizes erroneous operations: At first, the position of the virtual operating element is sensed with the aid of the haptic mark and subsequently the function is initiated by touching the virtual operating element. Furthermore, it is not necessary that the touch display 20 has to have a special shape. In particular, and in deviation to the prior art, it is not necessary that special, overlaid materials are applied onto the touch display as a result of which losses of transparency would occur.

The haptic marks 40.1 . . . 40.n and 42.1 . . . 42.n form a guide by which a finger of an operating person is guided to the associated virtual operating element 22.1 . . . 22.n, 24.1 . . . 24.n.

Figure 2:
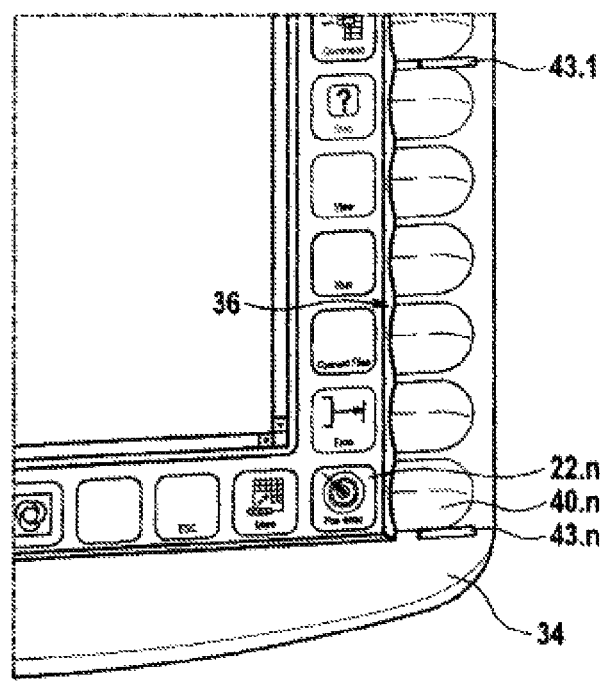
FIG. 2 shows a section of a display frame of the programmable manual device which frame is adjacent to the touch display.

FIG. 2 shows an enlarged review of the operating elements 22.1 . . . 22.n and the marks 40.1 . . . 40.n associated with them.

The arranging of the virtual operating elements 22.1 . . . 22.n and 24.1 . . . 24.n along the frame sections 36, 38 comprising the haptic marks 40.1 . . . 40.n, 42.1 . . . 42.n ensures a reliable, that is, secure operation of the virtual operating elements. The recessed and specially defined frame sections 36, 38 serve for the tactile orientation.

In the exemplary embodiment shown in FIG. 2 the haptic marks 40.1 . . . 40.n, 42.1 . . . 42.n are designed as finger troughs that are formed in such a manner that they can be reliably sensed with the fingers and ensure a guiding of the finger from the frame sections 36, 38 in the direction of the associated virtual operating element 22.1 . . . 22.n and 24.1 . . . 24.n.

This compensates on the one hand the main lacking haptic of a touch display 20 and on the other hand operator can direct his visual attention onto the industrial robot in the process without having to look at the manual operating device 10, as a result of which the operating safety is increased on the whole. A "blind operation" is made possible.

Figure 3:
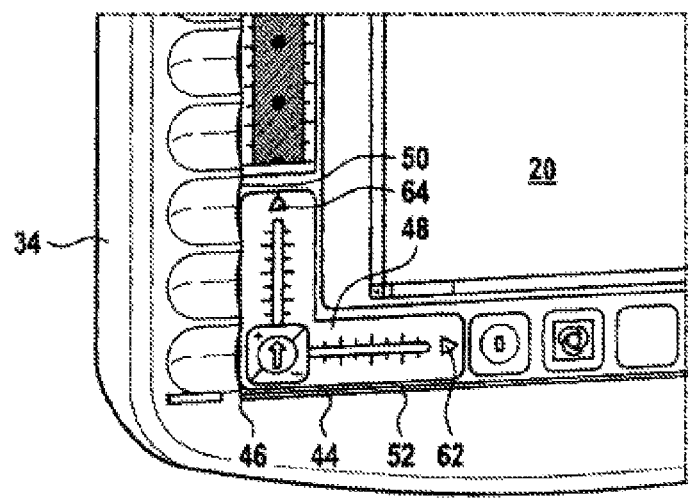
FIG. 3 shows a second section of a display frame adjacent to the touch display.

FIG. 3 shows an embodiment of a haptic mark 44 as a frame corner 46 of the display frame 34 bordering on the touch display 20. An unambiguous, exact position on the touch display 20 is defined by the frame corner 46 of the display frame 34. A virtual operating element 48 such as a virtual slide element is provided on the touch display 20 at these selected positions that is moved for example, in a linear direction along a display-side frame section 50 or along the other frame section 52 of the frame corner 44. The view and the function of the virtual slide element 48 changes as a function of the selected direction of movement.

Figure 4:
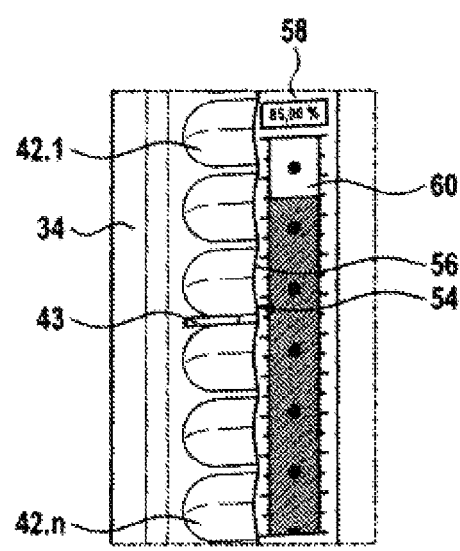
FIG. 4 shows a third section of a display frame adjacent to the touch display.

FIG. 4 shows another embodiment of a haptic mark 54 designed as a display-side frame section 56 of the display frame 34. The finger of an operating person can execute a shifting movement along the frame section 56 by which a virtual slide element 60 running along the frame section 56 can be adjusted.

The haptic marks 40.1 . . . 40.n, 42.1 . . . 42.n shown in FIGS. 1 and 2 and constructed as finger troughs form a haptic orientation of the display edge with high resolution, e.g., for the sensing of positions of the virtual operating elements 22.1 . . . 22.n, 24.1 . . . 24.n since they are arranged directly adjacent to the finger troughs. Each finger trough can be unambiguously associated with the virtual operating element. The finger troughs 40.1 . . . 40.n, 42.1 . . . 42.n are constructed to be half-open and opened in the direction of the touch display 20 so that a finger can slide as guided as in a groove on to the touch display 20 and can initiate a function of the virtual operating element 22.1 . . . 22.n, 24.1 . . . 24.n there. According to an independent concept of the invention it is provided that the initiation of a function associated with the virtual operating element 22.1 . . . 22.n, 24.1 . . . 24.n requires a manual action of the operating person on the touch display 20. In order to prevent an unintended initiation of the virtual operating elements 22.1 . . . 22.n, 24.1 . . . 24.n by an unintended touching, a function is not initiated until a pre-defined gesture such as, for example, moving a finger in a defined direction is carried out after the touching of the virtual operating element on the touch display 20. The sensitivity of the reaction to the finger movement can be gradually adjusted by a regulator. Therefore, the intensity of the required gesture for initiating functions can be gradually adjusted. It extends from a simple finger contact, a generally customary operation on the touch display 20, to a special, small gesture. As a result of the special definition of the finger troughs 22.1 . . . 22.n and 24.1 . . . 24.n in the frame sections 36, 38 of the display frame, the finger can slide in a continuation of the finger troughs onto the touch display. The meeting of the finger with this touch display 20 in conjunction with the subsequent short sliding further of the finger on the touch display is recognized as a linear gesture, which leads to the initiation of a function of the corresponding virtual operating element. Virtual operating elements can be reliably operated by the method. If the operator notices that he introduced an undesired initiation of a function, he can prevent the initiation of the function by withdrawing his finger into the original position.

As soon as the operator touches the virtual operating element 22.n with his finger, e.g., starting from the finger trough 40.n, the corresponding coordinates of the contact point on the touch display are detected by the control unit 30. The associated function is not released in accordance with the definition of a preset gesture until the finger of the operator leaves or exceeds a set coordinate range or reaches a predefined coordinate range.

According to another characteristic inventive concept of the invention virtual operating elements 48 placed, e.g., in the frame corner 46 of the display frame 34 are linked to a special gesture control. They can be shifted, e.g., along the frame sections 50, 52 in two directions 62, 64, as is shown in FIG. 3. Each direction of movement 62, 64 is associated with a selectable function. Therefore, it is, e.g., possible to activate a function "A" when moving along the frame section 52 and a function "B" when moving along the frame section 50. The degree of deflection is evaluated and two possibilities of evaluation are provided.

According to a first possibility of evaluation the degree of the deflection is immediately transmitted as an analog parameter such as the indication of speed to the function. If the finger is let loose in the extended position, the analogous value immediately jumps to zero. If the finger is guided in a sliding manner back into the initial position, i.e., into the frame corner, the parameter is set back to zero again analogous to the deflection. This function can be used, e.g., in order to start a movement program in a positive or negative direction and to vary the speed in a graduated manner at this time.

A second possibility of evaluation provides that when a definable threshold value is exceeded, a switching function is initiated. The activation of the function does not take place until the finger in the extended position leaves the touch display 20 when the threshold value has been exceeded. However, if the finger is withdrawn back into the zero position without letting loose of the frame sections 50, 52, the initiation of the function is prevented.

Another characteristic inventive concept of the invention relates to the realization of a so-called override function (speed regulator) that is realized by the virtual sliding operating element 60 shown in FIG. 4. For this, the sliding operating element 60 is placed along the frame section 56 and centrally to the haptic mark 43. The position of the sliding operating element 60 can be detected with the aid of the haptic mark 43 and be adjusted by shifting the finger along the frame section 56. The blind adjustment is additionally supported by the haptic marks 42.1 . . . 42.n, 43, 54 of the frame section 38. The so-called override can be adjusted by a shifting between two haptic marks 42.1 . . . 42.n by a defined amount, e.g., 20%. Even other analogous magnitudes such as process parameters can be adjusted in blind operation by the slide operating element 60 arranged on the edge side.

Another characteristic inventive feature relates to the symmetric arrangement of the haptic marks 40.1 . . . 40.n, 42.1 . . . 42.n relative to a longitudinal- and/or transversal central axis 68 of the touch display 20. The longitudinal central axis 68 is the straight line running centrally and parallel to the operating frame shanks of the display frame 34. The transversal central axis runs vertically to it, therefore, centrally between and parallel to the shorter transversal shanks of the display frame 34. As a result, it is ensured that the manual device 10 is suited for a right-hand operation and also a left-hand operation. This is achieved in particular by the consequent keyless design of the graphical operator interface and by the symmetric arrangement of the haptic marks. Therefore, the graphic operator interface can be switched by a simple setup function from right-hand operation to left-hand operation. All positions of the virtual operating elements 22.1 . . . 22.n, 24.1 . . . 24.n are mirrored here on the longitudinal central axis 68 of the touch display 20.

Figure 5:
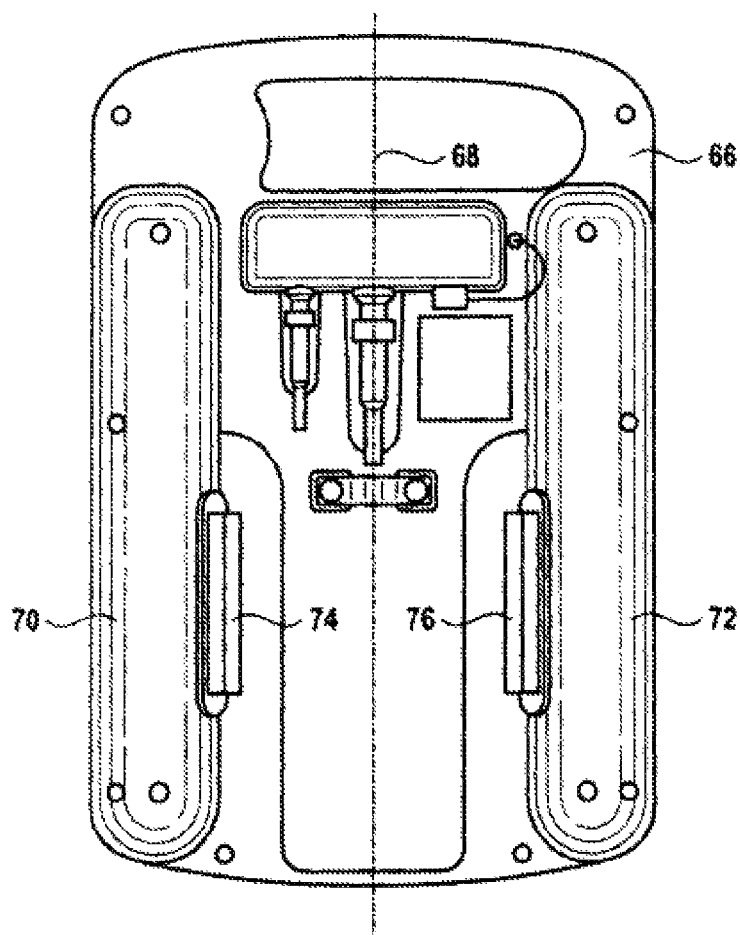
FIG. 5 shows a rear view of the programmable manual device.

FIG. 5 shows a back side 66 of the housing 32. Holding strips 70, 72 are arranged on the back side 66 and symmetrically to the longitudinal central axis 68 and the manual device 10 can be securely held by these strips with one or both hands. The holding strips 70, 72 can have an outer geometry that corresponds to cylindrical sections, wherein the holding strips 70, 72 should emanate from the outer edge, that is, from the longitudinal edges of the display frame 34. An enabling switch 74, 76 is integrated in each holding strip 70, 72, one of which must selectively be activated for freeing the movement of the industrial robot.

This symmetrical arrangement prevents the hands from becoming tired since the enabling switches 74, 76 can be alternately activated with the left or the right hand. If a hand becomes tired, the other hand can assume the enabling without the freeing of the movement being interrupted for the movement of the robot.

The invention claimed is:

1. A manual device for operating an industrial robot, the device comprising:
   a graphic operator interface having a touch-sensitive display that is configured to display a plurality of virtual operating elements; and
   a frame surrounding the touch-sensitive display;
   wherein the plurality of virtual operating elements is arranged along, and adjacent to, the frame;
   wherein a virtual operating element of the plurality of virtual operating elements represents a function for operating the robot when the virtual operating element is touched by an object;
   a control unit configured to control the graphic operator interface and to communicate with a control of the robot;
   a plurality of haptic marks arranged in a section of the frame;
   wherein a haptic mark of the plurality of haptic marks is configured as a recess in the frame;
   wherein the recess is open in a direction of the touch display;
   wherein a haptic mark of the plurality of haptic marks is associated with a virtual operating element of the plurality of virtual operating elements; and
   wherein the recess is associated with one of the plurality of virtual operating elements.

2. The device according to claim 1, wherein the plurality of haptic marks is arranged symmetrically to at least one of a longitudinal and transverse axis of the touch display, and on opposing sections of the frame.

3. The device according to claim 1, wherein the frame is part of a housing that receives the touch display.

4. The device according to claim 3, wherein the housing has a symmetrical construction.

5. The device according to claim 3, wherein the housing comprises:
   first and second symmetrically arranged holding strips disposed on a rear side of the device;
   a first enabling switch integrated with the first holding strip; and a second enabling switch integrated with the second holding strip.

6. The device according to claim 1, wherein one of the plurality of the virtual operating elements is configured as an adjustable virtual sliding element; and
  wherein the virtual sliding element is arranged along an edge section of the frame.

7. The device according to claim 1, comprising a moving path between two haptic marks of the plurality of haptic marks; and
  wherein the moving path is associated with an analogous value of the function of the virtual operating element.

8. The device according to claim 1, wherein the object is a pen or a digit of an operator of the device.

9. A method for operating an industrial robot, the method comprising:
  providing a manual device comprising a microprocessor and a graphic operator interface having a touch sensitive display that is configured to display a plurality of virtual operating elements; and
  a frame surrounding the touch sensitive display;
  touching a virtual operating element with an object, and detecting first coordinates of a contact point using the control unit;
  moving the object from the virtual operating element across the touch display; and
  initiating a function associated with the virtual operating element when the object leaves or exceeds a set coordinate range, after lasting contact of the object on the touch display.

10. The method of claim 9, wherein the moving of the object is carried out by a gesture of an operator of the manual device.

11. The method of claim 10, wherein the gesture is made by dragging a finger of the operating person or the pen on the contact-sensitive display into or out of the given coordinate range.

12. The method of claim 9, wherein the object is a pen or a finger of an operator of the device.

* * * * *